United States Patent
Yokoyama et al.

(10) Patent No.: US 7,771,792 B2
(45) Date of Patent: Aug. 10, 2010

(54) METHOD AND APPARATUS FOR ALKALINE SAPONIFICATION OF POLYMER FILM

(75) Inventors: Hiroki Yokoyama, Odawara (JP); Kazuhiro Muramasu, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 699 days.

(21) Appl. No.: 11/636,469

(22) Filed: Dec. 11, 2006

(65) Prior Publication Data

US 2007/0134443 A1    Jun. 14, 2007

(30) Foreign Application Priority Data

Dec. 9, 2005    (JP) .............................. 2005-356481

(51) Int. Cl.
*B05D 3/10* (2006.01)
*B05D 3/12* (2006.01)

(52) U.S. Cl. .................. 427/336; 427/337; 427/340; 427/341; 427/342; 427/352; 427/353; 427/354; 427/355; 427/356; 427/368

(58) Field of Classification Search ........................ None
See application file for complete search history.

(56) References Cited

U.S. PATENT DOCUMENTS

| | | | |
|---|---|---|---|
| 6,613,388 B1 * | 9/2003 | Kashiwabara et al. ....... | 427/348 |
| 2003/0049379 A1 * | 3/2003 | Kanke et al. ................. | 427/355 |
| 2003/0113456 A1 * | 6/2003 | Ichikawa et al. ............ | 427/355 |
| 2003/0194668 A1 * | 10/2003 | Kawanishi et al. .......... | 430/641 |
| 2004/0043154 A1 * | 3/2004 | Ichikawa et al. ............ | 427/355 |
| 2004/0149206 A1 * | 8/2004 | Kanke ........................ | 118/663 |
| 2005/0074555 A1 * | 4/2005 | Kawabe ...................... | 427/355 |

FOREIGN PATENT DOCUMENTS

| | | |
|---|---|---|
| JP | 6-226189 A | 8/1994 |
| JP | 8-94838 A | 4/1996 |
| JP | 8-323273 A | 12/1996 |
| JP | 2005281348 | * 10/2005 |

\* cited by examiner

*Primary Examiner*—Erma Cameron
(74) *Attorney, Agent, or Firm*—Sughrue Mion, PLLC (57) ABSTRACT

The present invention provides a method for alkaline saponification of a polymer film, comprising: an alkaline-solution coating step of coating a polymer film with an alkaline solution; a temperature keeping step of keeping the polymer film coated with the alkaline solution at temperature equal to or higher than room temperature; a reaction terminating step of terminating the reaction by applying a diluting solvent or an acid solution to the polymer film kept at the temperature; and a washing step of washing away the alkaline solution from the polymer film on which the reaction has been terminated, wherein the reaction terminating step uses a bar coater having a flat-surface bar to apply the diluting solvent or acid solution to the polymer film and remove the alkaline solution from the polymer film.

1 Claim, 3 Drawing Sheets

METHOD AND APPARATUS FOR ALKALINE SAPONIFICATION OF POLYMER FILM

BACKGROUND OF THE INVENTION

1. Field of the Invention

The present invention relates to a method and an apparatus for alkaline saponification of a polymer film, in particular, to a method and apparatus for alkaline saponification of a cellulose ester film, which is used as a transparent support for a continuous optical compensation sheet, in which wastewater used for a water-washing step after alkaline saponification was reused, whereby environmental load as well as costs are decreased.

2. Description of the Related Art

In recent years, there have been increasing demands for optical films. Such optical films include optical compensation sheets, which are used in liquid crystal cells as a retardation plate.

When producing an optical compensation sheet by forming an orientation film and an optically anisotropic layer, in which liquid crystal molecules are fixed, on a transparent support, good adhesion is required between the transparent support (usually, a cellulose ester film represented by a cellulose acetate film) and the orientation film (usually, a polyvinyl alcohol). Since the affinity between a cellulose ester film and a polyvinyl alcohol is weak, stripping or cracking often occurs at the interface thereof; thus, a gelatin undercoating layer has been provided on the cellulose ester film. However, to develop adhesion between the undercoating layer and the cellulose ester film, a solvent that penetrates into the cellulose ester film (e.g. a ketone solvent) must be used as a solvent for the coating fluid for providing a gelatin undercoating layer. The use of such a solvent causes the swelling of a cellulose ester film, which gives rise to a problem of causing fine bending of the film in the course of shrinkage in a subsequent drying step. It was found that if an orientation film and a liquid crystal molecule layer are provided on such a bent film, thickness non-uniformity of the orientation film and liquid crystal molecule layer or orientation non-uniformity of the liquid crystal molecules occurs along the bent shape, resulting in inferior image quality of liquid crystal displays.

On the other hand, as a commonly used method for improving the adhesion between a cellulose ester film and a hydrophilic material (e.g. orientation film) without providing a gelatin undercoating layer, a method is known in which a cellulose ester film is immersed in an alkaline aqueous solution, that is, a so-called saponification bath treatment is conducted. The details of such a saponifying method are described in Japanese Patent Application Laid-Open No. 8-94838. In this saponification bath treatment, in which a cellulose ester film is immersed in an alkaline aqueous solution, both sides of the cellulose ester film undergo hydrophilization simultaneously; thus, a problem occurs, when the cellulose ester film having a hydrophilic layer of polyvinyl alcohol etc. provided on its one side is wound up into a roll, of allowing the two sides of the film to adhere to each other. There is a method, as one example of methods for hydrophilizing one side of the cellulose ester film alone in the saponification bath treatment, in which the cellulose ester film is subjected to saponification treatment with its one side, on which saponification treatment is not intended, made waterproof with a laminate or the like. However, such methods not only increase the number of troublesome steps, but also produce unnecessary wastes, and thus, not being preferable from the viewpoint of productivity and environmental conservation.

In these circumstances, a saponification method was proposed in which a solution of alkali in water or in water and an organic solvent is continuously coated on one side of the polymer film alone on which an orientation film is to be provided, and after the reaction time has elapsed, the alkaline solution is washed away from the polymer film.

There have been used various types of coating apparatus for coating a continuously traveling belt-like support (web) with such an alkaline solution. Generally, a coating section is divided in two separate sections: a section where a coating solution is transferred to a film (an application system); and a section where the coating solution transferred to a film is measured to a desired amount of coating (measuring system). Following this, coating methods are classified according to the difference in application system or in measuring system.

Coating methods classified according to the difference in application system include: for example, roller coating, dip coating and fountain coating. Coating methods classified according to the difference in measuring system include: for example, air-knife coating, blade coating and bar coating (or rod coating). There are other coating methods, in which an application system and a measuring system are included in one section, such as extrusion coating, bead coating and curtain coating.

Of the above coating methods, bar coating is a coating method in which an excess amount of coating solution is transferred to a web and the excess coating solution is scraped away by a stationary or rotating bar to adjust the amount of coating. And a wire bar, a bar having a wire wound around its surface, or a rolling bar, a bar having grooves cut in its surface is commonly used because of its coating precision. However, a wire bar presents the problem of the end of the wire, particularly the portion at which a wire is fixed, being susceptible to corrosion due to the coating environment that contains acid or alkali.

As a device which solves the above problem, a method is described in Japanese Patent Application Laid-Open No. 6-226189 which employs spot welding, adhesive or brazing to fix a wire to a bar, thereby preventing the corrosion of the soldering at the end of the wire bar. In the meantime, a method is also described in Japanese Patent Application Laid-Open No. 8-323273 in which the end of a wire bar is notched to keep the solder filling at the wire-fixed portion to a minimum.

However, use of conventional bar coater (a wire bar or a rolling bar) makes the components extracted from the film by saponification reaction or the components of the saponifying coating solution itself likely to accumulate on the groove shoulder portion of the bar, and after about 1500-minute continuous coating, the contaminant components having accumulated on the groove shoulder portion of the bar come loose and fall and stick to the film, causing coating defects. This presents the problems of causing bright spot defects in the resultant product. Besides, every time the contaminant components accumulate on the bar, the production line needs to be stopped to clean the bar, and moreover, a large amount of washing water is required for the cleaning.

The present invention has been made in the light of these circumstances. Accordingly, the object of the present invention is to provide a method and apparatus for the alkaline saponification of a polymer film which enable the saponification reaction solution on the polymer film to be uniformly and efficiently scraped away in the reaction terminating step, thereby protecting the occurrence of scratch defects of a polymer film, which might be the cause of product defects such as bright spot defects.

SUMMARY OF THE INVENTION

To achieve the above object, a first aspect of the present invention is a method for the alkaline saponification of a polymer film, including: an alkaline-solution coating step of coating a polymer film with an alkaline solution; a temperature keeping step of keeping the polymer film coated with the alkaline solution at temperature equal to or higher than room temperature; a reaction terminating step of terminating the reaction by applying a diluting solvent or an acid solution to the polymer film kept at the temperature; and a washing step of washing away the alkaline solution from the polymer film on which the reaction has been terminated, wherein the reaction terminating step uses a flat bar to apply the diluting solvent or acid solution to the polymer film and remove the alkaline solution from the polymer film.

The present inventors has found that when continuously coating a continuously traveling polymer film with a diluting solution, if a flat bar with its surface kept smooth is used instead of a wire bar, contaminants are less likely to accumulate on the bar, whereby the contaminants' transfer to the polymer film can be prevented, and hence the occurrence of scratch defects of a polymer film. Although the use of a flat bar is likely to cause scraping non-uniformity in scraping of a saponification reaction solution, the present inventor has found, by providing proper smoothness to the surface of a flat bar, the conditions under which an appropriate amount of saponification reaction solution is scraped away uniformly.

According to the first aspect of the present invention, in the reaction terminating step in which the reaction is terminated by coating the polymer film with a diluting solution and scraping the saponification reaction solution away from the polymer film, a flat bar is used, whereby the saponification reaction solution can be uniformly and efficiently scraped away from the polymer film and the occurrence of scratch defects of a polymer film which might be the cause of product defects such as bright spot defects can be prevented.

A second aspect of the present invention is the method for the alkaline saponification of a polymer film according to the first aspect of the present invention, wherein the flat bar has a maximum surface roughness Rmax of 1 µm or less.

Traditionally, bar coating presents a problem such that the larger the uneven scratches on the surface of the bar becomes, the more the web becomes likely to be damaged when slip (contact) occurs between the web and the bar. Specifically, the number of revolution of the bar is determined by the conveying speed of the web and the diameter of the bar, and if the number of revolution of the bar is different from the designed one, slip (contact) occurs between the bar and the web, whereby the web is damaged. The present inventors have found the proper range of the surface roughness which the flat bar should have in scraping of a saponification reaction solution, whereby it is made possible to scrape away the saponification reaction solution uniformly and efficiently in the reaction terminating step of the alkaline saponification of a film and prevent the occurrence of scratch defects of a polymer film, which might be a cause of product defects such as bright spot defects.

Specifically, if the maximum surface roughness Rmax of the flat bar surface is larger than 1 µm, trouble that involves scratching the web is more likely to occur when slip (contact) occurs between the web and the bar, whereas if the maximum surface roughness Rmax of the flat bar surface is within the range of 0 to 1 µm, such trouble does not occur even when slip (contact) occurs between the web and the bar. Preferably the maximum surface roughness Rmax of the flat bar surface is 0.5 µm or smaller.

A third aspect of the present invention is the method for the alkaline saponification of a polymer film according to the first or second aspect of the present invention, wherein the flat bar has a straightness of 500 µm or lower.

Traditionally, when a bar having a smooth surface is used for scraping a coating solution, the scraping is often affected by the straightness of the bar, whereby uniform contact of the bar with the web cannot sometimes be obtained. Thus, there remains a problem, in scraping a coating solution with a bar having a smooth surface, of causing scraping non-uniformity. The present inventors have found the proper range of the straightness which a flat bar should have when used in scraping a saponification reaction solution, whereby it is made possible to scrape away the saponification reaction solution uniformly and efficiently in the reaction terminating step of the alkaline saponification of a film and prevent the occurrence of scratch defects of a polymer film, which might be a cause of product defects such as bright spot defects.

Specifically, if the straightness of the flat bar is higher than 500 µm, the deflection value of the bar during its rotation becomes large, whereby scraping non-uniformity is more likely to occur in scraping of saponification reaction solution. But on the other hand, if the straightness of the flat bar is 500 µm or lower, the scraping non-uniformity as above is less likely to occur.

Preferably the straightness of the flat bar is 300 µm or lower and more preferably 100 µm or lower.

A fourth aspect of the present invention is a polymer film, produced using a method for the alkaline saponification of a polymer film according to any one of the first to third aspects of the present invention.

A fifth aspect of the present invention is an optical compensation film, produced using a method for the alkaline saponification of a polymer film according to any one of the first to third aspects of the present invention.

According to the fourth and fifth aspects of the present invention, the present invention is applied mainly to methods for producing an optical compensation sheet or polymer film as a constituent of liquid crystal displays or the like, whereby an optical compensation sheet or polymer film free from bright spot defects etc. and good in quality stability can be obtained.

A sixth aspect of the present invention is a liquid crystal display, wherein the liquid crystal display is produced using an optical compensation film according to the fifth aspect of the present invention.

According to the sixth aspect of the present invention, an optical compensation film produced by applying the present invention is used, whereby a liquid crystal display free from defects such as bright spot defects can be provided.

To achieve the above object, a seventh aspect of the present invention is apparatus for the alkaline saponification treatment of a polymer film, including: an alkaline solution coating section for coating a polymer film with an alkaline solution; a temperature keeping section for keeping the polymer film coated with an alkaline solution at a temperature equal to or higher than room temperature; a reaction terminating section for terminating the reaction by applying a diluting solvent or acid solution to the polymer film kept at the temperature; and a washing section for washing away the alkaline solution from the polymer film on which the reaction has been terminated, wherein the reaction terminating section includes a flat bar used for applying the diluting solvent or acid solution to the polymer film and removing the alkaline solution from the polymer film.

According to the seventh aspect of the present invention, a flat bar is used in the reaction terminating section, where a diluting solution is coated on the polymer film and the saponification reaction solution is scraped away from the polymer film, whereby it is made possible to scrape away the saponification reaction solution uniformly and efficiently in the reaction terminating step of the alkaline saponification of a film and prevent the occurrence of scratch defects of a polymer film, which might be a cause of product defects such as bright spot defects.

According to the present invention, it is made possible to scrape away the saponification reaction solution uniformly and efficiently in the reaction terminating step of the alkaline saponification of a film and prevent the occurrence of scratch defects of a polymer film, which might be a cause of product defects such as bright spot defects.

DETAILED DESCRIPTION OF THE PREFERRED EMBODIMENTS

In the following preferred embodiments of the method and the apparatus of the present invention for alkaline saponification of a polymer film will be described in detail with reference to the accompanying drawings.

Figure 1:
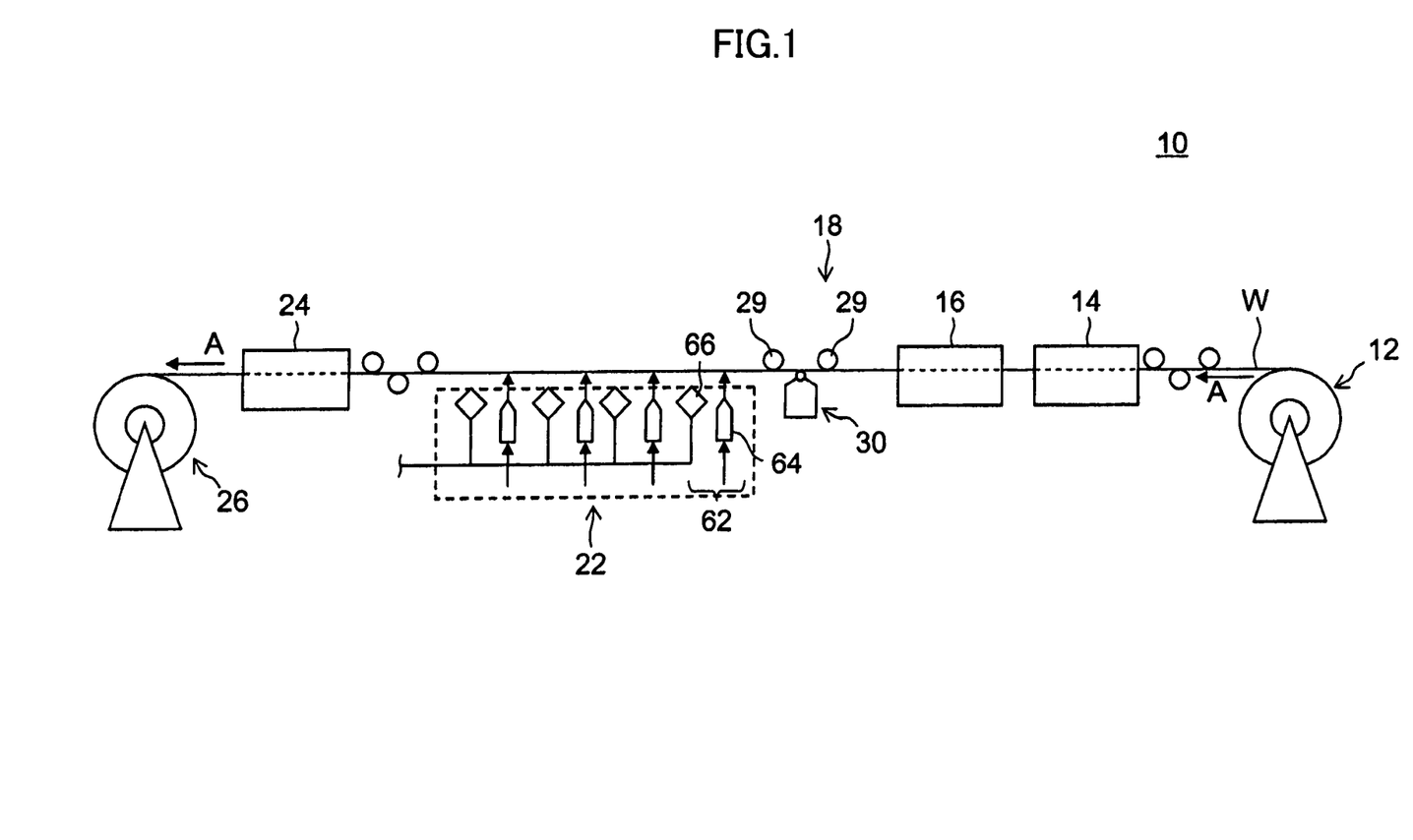
FIG. 1 is a diagrammatic view showing an alkaline saponification line of the present invention.

FIG. 1 is a diagrammatic view illustrating alkaline saponification line 10 to which the alkaline saponification method of the present invention is applied. Arrow A designates the direction in which the polymer film is conveyed.

As shown in FIG. 1, alkaline saponification line 10 consists mainly of: alkaline solution coating section 14 in which an alkaline solution is applied to a polymer film (hereinafter referred to as web W); temperature keeping section 16 in which the web W having the alkaline solution coated on its surface is kept at room temperature or higher; reaction terminating section 18 in which the reaction is terminated by coating the web W kept at room temperature or higher with a diluting solvent or an acid solution; washing section 22 in which the alkaline solution is washed away from the web W on which the reaction has been terminated; and drying section 24 in which the washed web W is dried.

Alkaline solution coating section 14 includes a coating device, not shown in the figure, which coats the bottom surface of the web W delivered from delivery machine 12 with an alkaline solution.

The details of the web W and alkaline solution used in this embodiment will be described later.

As the coating device described above, a die coater (extrusion coater or slide coater), roll coater (forward roll coater, reverse roll coater or gravure coater), or bar coater (bar around which a thin metal wire has been wound) or the like is preferably used. A rod coater, gravure coater, blade coater or die coater, which can be operated stably even in the area to which only a small amount of alkaline solution is applied, is particularly preferably used.

Desirably the amount of the alkaline solution coated is kept to a minimum, taking into consideration the disposal of liquid waste, because the alkaline solution is removed by washing with water afterwards. Preferably the amount is 1 to 100 cc/m$^2$ and more preferably 1 to 50 cc/m$^2$. Also preferably the fluctuation in coating amount across the width of the web W is kept less than 30%, and in coating amount per unit coating time is kept less than 30%.

The total number of the saponified sites (=the theoretical amount of alkali coating), which is obtained by multiplying the number of the sites, per unit area of the web W, on which saponification occurs by the saponifying depth required to develop the adhesion of the web W to an orientation film, gives a measure of the amount of the alkali coating required for the alkaline saponification reaction. The alkali is getting consumed with the progress of the saponification reaction, and the reaction rate becomes low. Thus, in practice, it is preferable to coat several times the above described theoretical amount of alkali. Specifically, the amount is preferably 2 to 20 times the theoretical amount of alkali coating and more preferably 2 to 5 times the same.

The temperature of the alkaline solution is desirably equal to the reaction temperature (=the temperature of the web W). To perform stable coating, preferably the temperature of the alkaline solution is lower than the boiling point of the alkaline solution, more preferably 5° C. lower than the boiling point of the alkaline solution, and most preferably 10° C. lower than the boiling point of the alkaline solution.

Temperature keeping section 16 includes a heating device, not shown in the figure, which keeps the web W at room temperature (about 15° C.) or higher after coating the alkaline solution and until terminating the saponification reaction.

As such a heating device, blowing of hot air against the opposite side to the side on which the coating is applied, contact heat transfer with a heating roll, induction heating with microwave, or radiation heating with an infrared heater is preferably used. Infrared heaters allow non-contact heating while avoiding air flow, and thus, use of an infrared heater can minimize the influence on the surface on which the alkaline solution has been coated and is preferable. As an infrared heater, an electric-, gas-, oil- or steam-type far infrared ceramic heater can be used. A commercially available infrared heater (e.g. one manufactured by Noritake Co., Limited) may also be used. An oil- or steam-type infrared heater, in which the heat transfer medium is oil or steam, is preferable from the viewpoint of explosion proofing in an atmosphere where an organic solvent coexists.

The temperature of the web W is 15° C. to 150° C., preferably 25° C. to 100° C., and more preferably 30° C. to 80° C. The temperature of the web W may be the same as or different from heated temperature of the web W before coated with the alkaline solution. To detect the temperature of the web W, a commercially available non-contact infrared thermometer can be used. And to control the temperature to keep it in the above temperature range, feedback control may be applied to the heating device.

The time to keep the web W in the above temperature range, after coating the alkaline solution and before washing away the same, is preferably 1 second to 5 minutes, more preferably 2 to 100 seconds, and particularly preferably 3 to 50 seconds, though depending on the conveying speed described below.

The conveying speed of the web W is determined depending on the combination of the composition of the above alkaline solution and the coating method employed. Generally preferably the conveying speed of the web W is 10 to 500 m/min and more preferably 20 to 300 m/min.

Preferably the web W undergoes saponification treatment in an atmosphere where the oxygen concentration is in the range of 0 to 18%, more preferably in the range of 0 to 15%, and most preferably in the range of 0 to 10%. Applying a saponifying coating solution (alkaline solution) in an atmosphere of low oxygen concentration makes it possible to control the surface characteristics of the web W, thereby obtaining a highly adhesive surface. The gaseous component, other than oxygen, in the atmosphere is preferably an inert gas (e.g. nitrogen, helium or argon) and particularly preferably nitrogen.

Reaction terminating section 18 includes flat-bar coater 30 which coats the web W with a diluting solvent so as to lower the alkali concentration, thereby terminating the saponification reaction of the alkaline solution with the web W.

Figure 2:
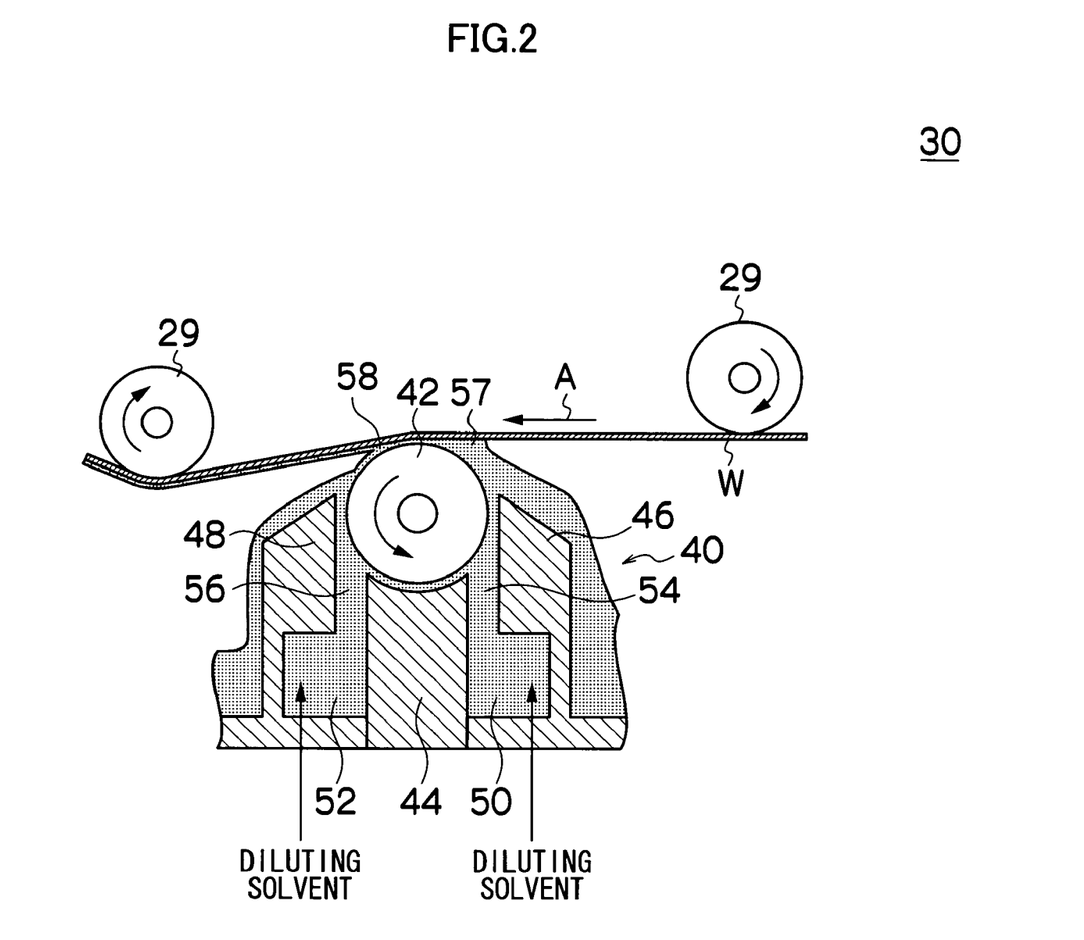
FIG. 2 is a cross-sectional view of a flat-bar coater of the present invention.

First, the configuration of flat-bar coater 30, which is the main part of the present invention, will be described.

FIG. 2 is a view illustrating the configuration of flat-bar coater 30 of the present invention. As shown in FIG. 2, flat-bar coater 30 consists mainly of: coating head 40, and a pair of guide rollers 29, 29 which guide web W so that web W travels in close proximity to flat bar 42.

Coating head 40 consists mainly of: flat bar 42, back-up member 44 which supports flat bar 42 rotatably, and coater blocks 46, 48.

Between back-up member 44 and each of coater blocks 46, 48, manifolds 50, 52 and slots 54, 56 are formed and to each of manifolds 50, 52 a diluting solvent is fed. The diluting solvent fed to each of manifolds 50, 52 is extruded uniformly across the width of the web via each of slots 54, 56 which are parallel to each other across the width of the web and narrow in the travel direction of the web. As a result, in the upstream of flat bar 42 in the direction in which web W is fed (hereinafter referred to as "first side") is formed first-side coating bead 57, while in the downstream of flat bar 42 in the same direction (hereinafter referred to as "second side") is formed second coating bead 58. Thus, flat bar 42 transfers and applies the diluting solvent to traveling web W via coating beads 57, 58.

The diluting solvent fed to excess from manifolds 50, 52 overflows between each of coater block 46, 48 and web W and is recovered through gutters. The feeding of the diluting solvent to manifolds 50, 52 is performed from the center portion or edge portion of manifolds 50, 52.

Coating head 40 is further provided with a side block (not shown in the figure) for regulating the width of the diluting solvent feeding and discharging the diluting solvent having overflowed (the side block may incorporate a return system depending on the situation so that the diluting solvent is reused). The width of the above slots, slots 54, 56, is set by the side block and the width of solvent feeding is regulated, whereby the target coating width is determined.

Preferably flat bar 42 is rotated in the same direction as the direction in which web W travels and at the same speed as that of web W.

Figure 3:
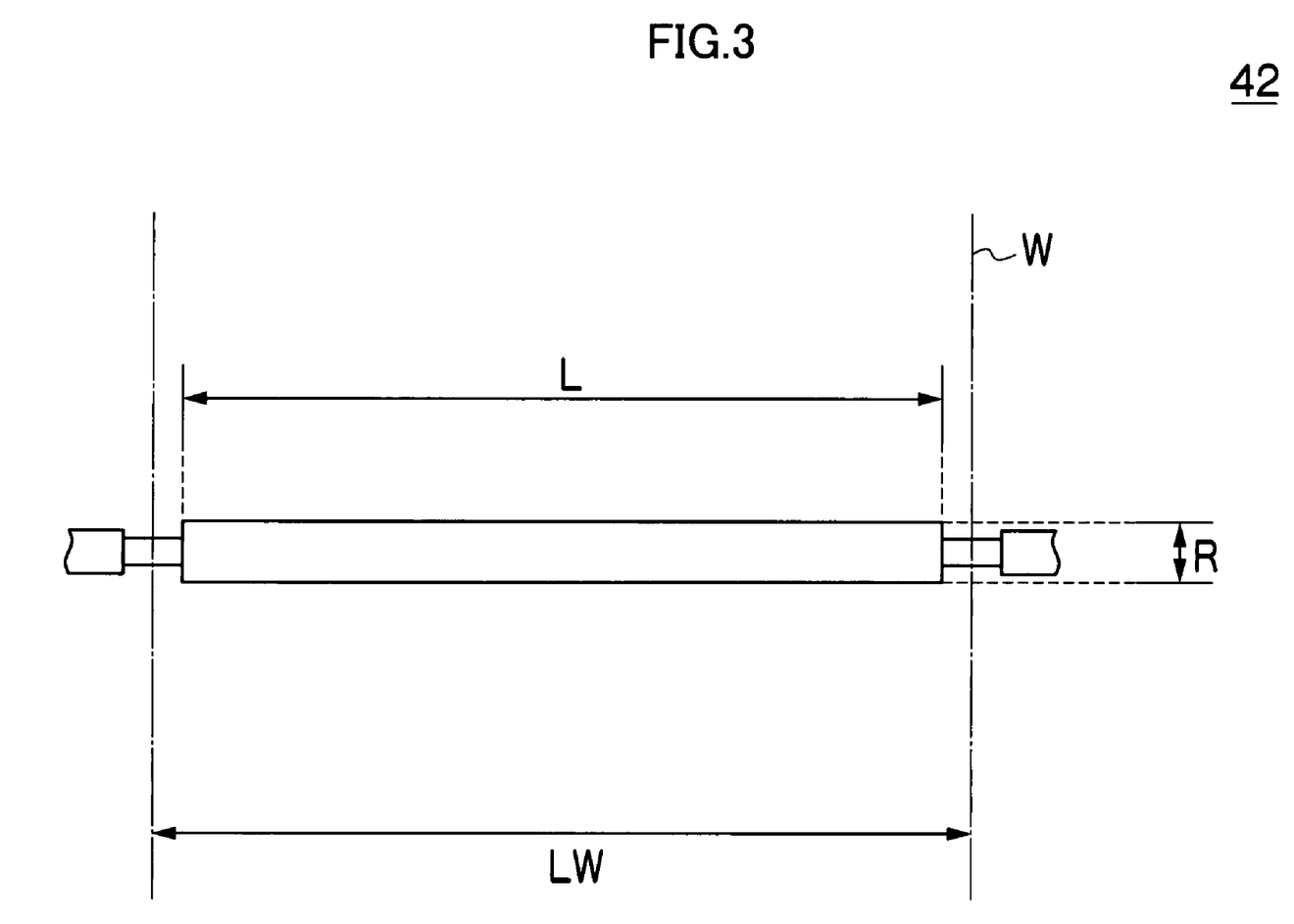
FIG. 3 is a plan view of a flat bar of the present invention.

The shape of flat bar 42, which is a characteristic part of the present invention, will be described. FIG. 3 is a plan view showing the shape of flat bar 42, seen from the direction in which web W is conveyed. In FIG. 3, reference characteristic LW designates the width of web W.

Flat bar 42 of FIG. 3 is a bar whose surface is smooth. As shown in FIG. 3, the diameter R of flat bar 42 is determined depending on the target thickness of the coating film or the amount of the coating solution scraped. Preferably the diameter R is in the range of 4 mm to 12 mm.

The whole length L of flat bar 42 across the width of web W is determined by the size of the liquid crystal displays produced. Preferably the length L is in the range of 1500 mm to 2100 mm.

The material for flat bar 42 is preferably such that it is highly resistant to corrosion by alkaline or acid coating solution, highly strong, and highly abrasion resistant. For example, a stainless material, a stainless material having its surface plated, or the like is used. In this embodiment, SUS304 is preferably used.

The surface roughness of flat bar 42, particularly the maximum surface roughness of the same is preferably 0 to 1 µm and more preferably 0 to 0.5 µm. The term "maximum surface roughness Rm" used in the present invention means the maximum surface roughness obtained by the following measuring method. Flat bar 42 is placed transversely and the surface roughness is measured for arbitrary five different sections 10 mm long along the lengthwise direction with a contact-type surface roughness measuring instrument (E-RC-S01A, manufactured by TOKYO SEIMITSU CO., LTD., trade name: Surfcom). The maximum surface roughness is obtained for each of the five measuring sections, and the maximum value of the five maximum values obtained is defined as the maximum surface roughness Rmax of the flat bar 42.

The straightness of flat bar 42 is preferably 500 µm or lower, more preferably 300 µm or lower, and much more preferably 100 µm or lower.

The term "straightness" used in the present invention means the straightness obtained by the following measuring method. Flat bar 42 is fixed so that it is suspended vertically and it is rotated at an arbitrary point through an angle of 360°. The deflection value of flat bar 42 is determined using a non-contact-type laser displacement sensor. The deflection values of flat bar 42 are determined for 7 points across the length of flat bar 42 and the maximum deflection value at each measuring point is recorded. The particularly preferred range of the deflection value of flat bar 42 is 100 µm or smaller.

The circularity of flat bar 42 is preferably such that when the outside diameter of flat bar 42 is 8 mm, the error is in the range of 30 µm or smaller and more preferably 10 µm or smaller.

In the following the method for producing flat bar 42 of the present invention will be described.

First, the selected material is machined into a shaft, which is straightened and then roughly machined by centerless grinding. Then, the workpiece is further grooved at a constant depth, straightened, finished by centerless grinding, and again straightened. After that, its surface is smoothed by superoll burnishing, and the smoothed workpiece is washed and inspected to complete flat bar 42.

Centerless grinding is a type of cylindrical grinding, and centerless grinder has no center for supporting a workpiece and is made up of basic elements: a grinding wheel, a blade and a regulating wheel. The blade supports the workpiece, while the regulating wheel controls the rotation of the workpiece and gives the workpiece feeding rate and the regulating wheel, which gives the workpiece rotation, and the rotating grind stone perform grinding of the workpiece supported by the blade. As centerless grinder, high performance centerless grinder C4520FS, manufactured by Koyo Machine Industries Co., Ltd., can be used.

Superoll burnishing is centerless-type roller burnishing which finishes the surface of metal, such as the surface of shafts, to a mirror-like smooth surface by pressing and leveling the metal surface with a roller to subject the surface to plastic deformation. As a superoll burnishing tool, Superoll Mugen SMH-1203WE, manufactured by Sugino Machine Limited, can be used.

The diluting solvent used in this embodiment is a solvent in which the alkali agent in the alkaline solution is dissolved. As such a diluting solvent, water or a mixed solution of an organic solvent and water is preferably used and water is more preferably used. Besides, an organic solvent used in the above described alkaline saponification can be preferentially used. Two or more kinds of organic solvents may also be used in the form of a mixture.

The amount of the above diluting solvent to be coated is determined depending on the concentration of the alkaline solution. In case of flat-bar coater 30, since the flow in the coating beads is not uniform, the alkaline solution and the diluting solvent are mixed and the mixed solution is coated again. Thus, it is difficult, in this case, to specify the diluting rate by the amount of diluting solvent coated, and therefore, the alkali concentration after coating of the diluting solvent needs to be measured. The amount of diluting solvent to be coated is preferably such that it brings a 1.5- to 10-fold dilution of the original alkali concentration and more preferably a 2- to 5-fold dilution.

To terminate the saponification reaction with an alkali quickly, besides the above diluting solvent, an acid can also be used. In this case, to neutralize the alkali with a smaller amount of acid, a strong acid is preferably used. Considering the easiness of water-washing operation, it is preferable to select an acid which undergoes neutralization reaction with an alkali to form a salt highly soluble in water. For example, hydrochloric acid, nitric acid, sulfuric acid, phosphoric acid, chromic acid, methanesulfonic acid or citric acid is preferably used.

The amount of acid solution to be coated is determined depending on the kind and concentration of the alkaline solution. Preferably, the amount is determined so that it gives a pH of 4 to 9 after coating of acid solution and more preferably a pH of 6 to 8.

Washing section 22 is a section in which the alkaline saponification reaction solution remaining on the surface of web W is washed away and removed, because the alkaline solution remaining on web W not only allows the saponification reaction to progress, but also affects the film formation or orientation of liquid crystal molecules of an orientation film and a liquid crystal molecule layer, which are to be applied afterward.

Washing section 22 includes a plurality of water-washing/draining units 62 which wash and remove the alkaline solution remaining on the surface of web W.

Each water-washing/draining unit 62 includes water-washing device 64 which sprays washing water directly on web W and draining device 66 which removes the water film from web W.

Preferably, a number of water-washing/draining units 62 may be arranged in tandem. From the viewpoint of installation space or cost, usually 2 to 10 and preferably 2 to 5 water-washing/draining units 62 are installed.

As water-washing devices 64 described above, spray nozzles which spray washing water directly on the web W are suitably used. Such spray nozzles are arranged across the width of the web W so that the water stream impacts against the full width of the web W. As the spray nozzles, commercially available spray nozzles (e.g. ones manufactured by IKEUCHI Co., Ltd. or Spraying Systems Co., Japan) may also be used. Arranging spray nozzles in such a manner makes it possible to wash the alkaline solution away from the web W while conveying the web W continuously, and besides, the jet of washing water from the spray nozzles allows highly turbulent mixing of washing water and the alkaline coating solution on the web W, thereby enhancing the washing effect.

Water-washing devices 64 are not limited to the above example, but methods using coating heads (e.g. fountain coaters or frog mouth coaters) can also be used.

The speed at which washing water is sprayed in water-washing device 64 is in such a range that allows highly turbulent mixing and keeps the conveying stability of the web W. Specifically, it is preferably 50 to 1000 cm/sec, more preferably 100 to 700 cm/sec, and much more preferably 100 to 500 cm/sec.

The amount of the washing water used in the water-washing operation is larger than the amount derived from the theoretical dilution defined below.

Theoretical dilution=amount of washing water used [cc/m$^2$]÷amount of alkaline saponification solution coated [cc/m$^2$]

Specifically, theoretical dilution is defined based on the assumption that the whole amount of the water used in the water-washing operation contributes to the dilution mixing of the alkaline coating solution. In actuality, however, complete mixing does not occur, and thus, the amount of washing water used exceeds the amount derived from the theoretical dilution. The amount of the washing water used is at least 100 to 1000 times the amount derived from the theoretical dilution, preferably 500 to 10000 times, and more preferably 1000 to 100000 times, though it depends on the alkali concentration of the alkaline coating solution used, or the kind of the secondary additives or solvent used.

When a fixed amount of washing water is used in the water-washing operation, it is preferable not to use the whole amount of water at a time, but to use by batch washing process in which the water is used batchwise. Specifically, the washing water is divided into several batches and fed batch wise to a plurality of washing devices arranged in tandem in the direction in which web W is conveyed. A proper time (distance) is provided between one water-washing device 64 and the next water-washing device 64 so that the dilution of the alkaline coating solution by diffusion is allowed to progress.

The washing water is preferably deionized water. The deionized water used in the present invention is preferably such that its specific electric resistance is at least 0.1 MΩ or higher, in metal ion content, particularly sodium, potassium, magnesium or calcium content is lower than 1 ppm, and its anion, such as chloride or nitrate anion, content is lower than 0.1 ppm.

The higher the temperature of the washing water, the higher the washing power of the washing water. Accordingly, the temperature of the washing water is usually in the range of 5 to 90° C., preferably in the range of 25° C. to 80° C., and more preferably in the range of 25° C. to 60° C.

As draining device 66 described above, a blade used in blade coater, an air-knife used in air-knife coater, a bar used in bar coater, or a roll used in roll coater is used. Of these devices, an air-knife is suitable for use because it can decrease the thickness of the water film to the utmost limit.

Although the amount of the air blown off in draining device 66 varies depending on the original thickness of the water film on the web W or the conveying speed of the web W, generally air blown at 10 to 500 m/sec, preferably 20 to 300 m/sec, and more preferably 30 to 200 m/sec is used.

If the clearance between the surface of the web W conveyed and the air plenum of the air-knife is made small, the draining performance is improved; but on the other hand, the air-knife is more likely to come in contact with the web W and scratch the same. Thus, the clearance is kept in the proper range. Generally an air-knife is installed while keeping the clearance 10 μm to 10 cm, preferably 100 μm to 5 cm, and more preferably 500 μm to 1 cm. A back-up roll may be installed, in such a manner as to face the air-knife, on one side of the web opposite to the side undergoing water washing so that the setting of the clearance is stabilized and the effect of the flapping, wrinkles or deformation of the web W can be alleviated.

The washing method is not limited to the above described one, but various other methods, such as a method in which the alkaline solution is coated with washing water or a method in which web W is immersed in a container containing washing water, may also be used.

Drying section 24 includes a drying device, not shown in the figure, which removes the washing water etc. remaining on the web W and heat dries the web W, before the web W is wound up into a roll, to adjust the web's moisture content to a preferred level. On the other hand, drying section 24 can also perform moisture conditioning with air having a set humidity.

As such a drying device, a known drying device is used which supplies clean air having been heated by a heater etc. The temperature of the dry air is preferably 30 to 200° C., more preferably 40 to 150° C., and particularly preferably 50 to 120° C. When the water film is fully removed from the web W by a draining section 66, such as an air-knife, in the preceding section, drying section 24 need not be provided.

The web W having undergone alkaline saponification as above may be wound up with wind-up machine 26 once or may be provided with a functional layer subsequently after the above saponification treatment step. In either case, one side of the web W, which has undergone saponification treatment as described above, and the other side of the web W can be prevented from adhering to each other even when the web W is wound up into a roll.

The flow of the alkaline saponification of a polymer film using alkaline saponification line 10 shown in FIG. 1 will be described.

First, a web W is delivered from the delivery machine 12.

The web W is delivered, while being guided by guide rollers, to alkaline solution coating section 14 where its surface is coated with an alkaline solution. Then the web W is conveyed to temperature keeping section 16 where it undergoes saponification reaction with the alkaline solution.

Web W having undergone saponification reaction in temperature keeping section 16 is conveyed to reaction terminating section 18, where the alkaline solution on web W is coated with a diluting solvent by flat bar 42 of flat-bar coater 30 to terminate the alkaline saponification reaction. The use of flat bar 42 allows the saponification reaction solution remaining on web W to be reduced to 30% of the amount of the saponification reaction solution remaining on web W when conventional method is used and allows the same to be uniformly scraped off from the surface of web W.

After that, the surface of web W on which the saponification solution still remains is washed with water sprayed by water-washing/draining unit 62 of washing section 22. Then, the water film on web W is removed by draining device 66. The water-washing/draining step by water-washing/draining unit 62 is repeated more than one time to remove the alkaline saponification reaction solution on web W.

Then, web W is conveyed to drying section 24, where it is exposed to dry air to be heated and dried. Web W having been dried is wound up by wind-up machine 26.

As described so far, using the flat bar of the present invention in the reaction terminating step of the alkaline saponification method makes it possible to scrape away the saponification reaction solution uniformly and efficiently and prevent the occurrence of scratch defects of web W, which might be a cause of product defects such as bright spot defects.

In the following, web W (polymer film) and the alkaline solution which are used in the alkaline saponification treatment of the present invention will be described in detail.

[Polymer Film (Web W)]

The polymer film (web W) used in this embodiment preferably has a light transmittance of 80% or higher. The web W is preferably such that it is less likely to become birefringent when subjected to external force. The web W includes a hydrolyzable bond (bond subject to saponification treatment) such as ester or amide bond. Preferably the web W is an ester bond and more preferably an ester bond in the side chain of the polymer. A typical polymer having an ester bond in the side chain is a cellulose ester. Preferably the cellulose ester is a lower fatty acid ester of cellulose, more preferably cellulose acetate, and most preferably cellulose acetate having an acetylation degree of 59.0 to 61.5%. The term "acetylation degree" means the amount of acetic acid bonded per unit mass cellulose. The acetylation degree is obtained in accordance with the measurement and calculation of acetylation degree stipulated in ASTM: D-817-91 (testing method for cellulose acetate etc.).

The average viscometric degree of polymerization (DP) of the cellulose ester is preferably 250 or higher and more preferably 290 or higher. Preferably the cellulose ester used in the present invention has a narrow molecular weight distribution, Mw/Mn (Mw represents mass average molecular weight and Mn number average molecular weight), obtained by gel permeation chromatography. Specifically, the preferred Mw/Mn value is 1.0 to 1.7.

When the web W is used as an optical compensation sheet, preferably the web W has high retardation values. The Re retardation value and Rth retardation value of the web W are defined by the following expressions (I) and (II).

$$Re = |nx - ny| \times d \quad \text{(I)}$$

$$Rth = \{(nx + ny)/2 - nz\} \times d \quad \text{(II)}$$

In the above expressions (I) and (II), nx represents the refractive index in the web W plane in the slow-axis direction (in the direction in which the refractive index reaches a maximum), ny the refractive index in the web W plane in the fast-axis direction (in the direction in which the refractive index reaches a minimum), nz the refractive index across the thickness of the web W, and d the thickness of the web W in nm. Preferably, the Re retardation value of the web W is 1 to 200 nm and the Rth retardation value of the web W is 70 to 400 nm. The specific values are obtained by extrapolating the Re and Rth values measured while inclining the incident direction of measuring light relative to the vertical direction to the web W plane. The measurement can be made using ellipsometer (e.g. M-150, manufactured by JASCO Corporation). The measuring wavelength employed is 632.8 nm (He—Ne laser).

To adjust the retardation of the web W, generally a method is employed in which external force such as drawing is applied to the web W; however, a retardation increasing agent, which adjusts optical anisotropy, may also be added depending on the situation. To adjust the retardation of cellulose acylate films, preferably an aromatic compound having at least two aromatic rings is used as a retardation increasing agent. The amount of the aromatic compound used is preferably in the range of 0.01 to 20 parts by mass per 100 parts of cellulose acylate. Two or more kinds of aromatic compounds may also be used in combination. The aromatic rings of the aromatic compounds include not only aromatic hydrocarbon rings, but also aromatic heterocycles. The molecular weight of the retardation increasing agent is preferably 300 to 800.

Preferably the web W (polymer film) is produced by a solvent cast method. In the solvent cast method, a film is produced using a solution of a polymer material in an organic solvent (dope). Preferably the organic solvent used includes a solvent selected from the group consisting of: ethers having 3 to 12 carbon atoms, ketones having 3 to 12 carbon atoms, esters having 3 to 12 carbon atoms, and hydrocarbon halides having 1 to 6 carbon atoms. The ethers, ketones and esters may have a cyclic structure. A compound having two or more functional groups of ethers, ketones and esters (i.e. —O—, —CO— and —COO—) can also be used as an organic solvent. The organic solvent used may have other functional groups such as alcoholic hydroxyl group. In organic solvents having two or more kinds of functional groups, the number of carbon atoms is not limited, as long as it is within the range specified with respect to the compound having any one of the functional groups.

Examples of ethers having 3 to 12 carbon atoms include: diisopropyl ether, dimethoxymethane, dimethoxy ethane, 1,4-dioxane, 1,3-dioxolane, tetrahydrofuran, anisole and phenetole. Examples of ketones having 3 to 12 carbon atoms include: acetone, methyl ethyl ketone, diethyl ketone, diisobutyl ketone, cyclohexanone and methylcyclohexanone. Examples of esters having 3 to 12 carbon atoms include: ethyl formate, propyl formate, pentyl formate, methyl acetate, ethyl acetate and pentyl acetate. Examples of organic solvents having two or more kinds of functional groups include: 2-ethoxyethyl acetate, 2-methoxyethanol and 2-butoxyethanol. Preferably the number of carbon atoms of the hydrocarbon halides is 1 or 2 and most preferably 1. The halogen of the hydrocarbon halides is preferably chlorine. The percentage of the hydrogen atoms of the hydrocarbon halides replaced with halogen is preferably 25 to 75% by mole, more preferably 30 to 70% by mole, much more preferably 35 to 65% by mole, and most preferably 40 to 60% by mole. Methylene chloride is a typical hydrocarbon halide. Two or more kinds of organic solvents may be used in the form of a mixture.

The polymer solution can be prepared by a commonly used process. The commonly used process means treating at 0° C. or higher (at ordinary temperature or a high temperature). The solution can be prepared using the process and apparatus for preparing a dope in a commonly used solvent cast method. When employing a commonly used process, it is preferable to use a hydrocarbon halide (particularly methylene chloride) as an organic solvent. The amount of the polymer used is adjusted so that the polymer content in the resultant solution is 10 to 40% by mass. The amount of the polymer in the resultant solution is preferably 10 to 30% by mass. To the organic solvent (prime solvent), any of the additives described later may be added in advance. The solution can be prepared by stirring the polymer and the organic solvent at ordinary temperature (0 to 40° C.). In a highly concentrated solution, stirring may be performed under pressure and heating. Specifically, the polymer and the organic solvent are put into a pressure container, and the mixture is stirred, with the container made airtight, under pressure and heating at temperatures of the boiling point of the solvent at ordinary temperature or higher and of not allowing the boiling of the solvent. The heating temperature is usually 40° C. or higher, preferably 60 to 200° C., and more preferably 80 to 110° C.

The ingredients may be roughly mixed before they are introduced into a container. Or they are introduced into a container one by one. The container used need to be so constructed as to allow stirring in it. The container can be brought to the pressurized state by introducing an inert gas such as nitrogen into it. The increase in the vapor pressure of the solvent by heating can also be utilized. Or the ingredients may be added under pressure after making the container airtight. When heating the ingredients, it is preferable to heat them from the outside of the container. For example, a heater having a jacket structure may be used to heat them from outside. Or a method can also be employed in which the entire container is heated by providing a plate heater and piping on the outside of the container and circulating a fluid through the piping. It is also preferable to provide a stirring blade inside the container and perform stirring using the blade. Preferably the stirring blade is so long that it can almost reach the inside wall of the container. Preferably a scraper blade is provided at the end of the stirring blade to replace the fluid film on the wall of the container. The container may be equipped with instruments such as pressure gauge and thermometer. In the container, the ingredients are dissolved in the solvent. The resultant dope is cooled and then taken out from the container, or it is taken out from the container and then cooled using a heat exchanger or the like.

The solution can also be prepared by cooling-dissolving process. By the cooling-dissolving process, polymer can be dissolved in an organic solvent in which polymer is hard to dissolve by any one of commonly used dissolving processes. Even when a solvent is used in which polymer can be dissolved by a commonly used process, if the cooling-dissolving process is employed, a homogeneous solution can be obtained rapidly. In the cooling-dissolving process, first, polymer is added to the organic solvent little by little at room temperature under stirring. Preferably the amount of the polymer used is adjusted so that the polymer content in the mixture is 10 to 40% by mass and more preferably 10 to 30% by mass. To the mixture, any of the additives described later may be added in advance.

Then, the mixture is cooled to −100° C. to −10° C., preferably −80° C. to −10° C., more preferably −50° C. to −20° C., and most preferably −50° C. to −30° C. Cooling can be performed in, for example, a dry ice/methanol bath (−75° C.) or cold diethylene glycol solution (−30 to −20° C.). Such a cooling operation allows the mixture of the polymer and organic solvent to be solidified. The cooling rate is preferably 4° C./min or higher, more preferably 8° C./min or higher, and most preferably 12° C./min or higher. The term "cooling rate" herein used means the value obtained by dividing the difference between the temperature at the time of starting cooling and the temperature at the time of completing cooling by the time from starting cooling to completing cooling.

Then, the above cooled mixture is heated to 0 to 200° C., preferably 0 to 150° C., more preferably 0 to 120° C., and most preferably 0 to 50° C. to dissolve the polymer in the organic solvent. Heating may be performed simply by leaving the mixture stand at room temperature or in a warm bath. The heating rate is preferably 4° C./min or higher, more preferably 8° C./min or higher, and most preferably 12° C./min or higher. The term "heating rate" herein used means the value obtained by dividing the difference between the temperature at the time of starting heating and the temperature at the time of completing heating by the time from starting heating to completing heating. The above operations allow a homogeneous solution to be produced. When the polymer is not fully dissolved in the solvent, such cooling and heating operations may be repeated. Whether the polymer is fully dissolved in the solvent or not can be judged simply by visually observing the appearance of the solution.

In the cooling-dissolving process, to avoid the inclusion of moisture due to the moisture condensation at the time of cooling, desirably a closed top container is used. In the cooling and heating operations, if pressure is applied during cooling and pressure is reduced during heating, the time required for dissolving the polymer can be decreased. To perform pressurization and depressurization, desirably a pressure resistant container is used. Measurement by differential scanning calorimetry (DSC) has revealed that in a 20% by mass solution of cellulose acetate (acetylation degree: 60.9%, average viscometric degree of polymerization: 299) in methyl acetate prepared by the cooling-dissolving process, there exists a pseudo sol-gel phase transition point at around 33° C. And at temperatures lower than the temperature, the solution is in the homogeneous gel state. Thus, the solution needs to be kept at temperatures equal to or higher than the pseudo phase transition point and preferably of about gel phase transition temperature plus about 10° C. It is to be understood that the pseudo phase transition point varies depending on the acetylation degree, average viscometric degree of polymerization or concentration of the cellulose acetate, or the organic solvent used.

A polymer film is formed using the prepared polymer solution (dope) by a solvent cast method. A film is formed by casting the dope over a drum or band and vaporizing the solvent. Preferably, the concentration of the dope before casting is adjusted so that its solid content is 18 to 35%. Also preferably, the surface of the drum or band is planished mirror finished surface in advance. Preferably the dope is cast over a drum or band whose surface temperature is kept at 10° C. or lower. Preferably air is blown on the dope after casting for 2 seconds or longer to dry the dope. The residual solvent can be vaporized by stripping the resultant film off from the drum or band and drying the same with hot air while varying the temperature of the hot air from 100 to 160° C. This operation allows the time from casting to stripping to be shortened. To perform this method, the dope must be gelled at the temperature of the drum or band surface at the time of casting.

To improve the mechanical properties or enhance the drying speed, to the web W, a plasticizer can be added. As such a plasticizer, a phosphate ester or carboxylate ester is used.

As such a plasticizer, a phosphate ester or carboxylate ester is used. The amount of the plasticizer added is preferably 0.1 to 25% by mass of the amount of cellulose ester, more preferably 1 to 20% by mass, and most preferably 3 to 15% by mass.

Further, to the web W in accordance with this embodiment, various additives (e.g. ultraviolet screening agents, fine particles, releasing agents, antistatics, deterioration inhibitor (e.g. antioxidants, peroxide decomposition agents, radical inhibitors, metal inactivating agents, acid scavengers or amines), or infrared absorbers) may be added depending on its application. The additives may be in the solid state or oily matter state. When the web W is multilayered, the layers may contain different kinds of or different amounts of additives. The amount of the additive used is not limited as long as they perform their function; however, it is preferably in the range of 0.001 to 20% by mass of the total composition of the web W.

The web W can be subjected to stretching treatment so that its retardation is adjusted. The percentage of stretching is preferably 3 to 100%. The thickness of the web W is preferably 30 to 200 µm and more preferably 40 to 120 µm.

[Alkaline Solution]

The alkaline solution used in this embodiment can be prepared by dissolving an alkali in water or in a mixed solution of an organic solvent and water. Preferably the organic solvent is an organic solvent or two or more kinds of organic solvents selected from the group consisting of: alcohols having 8 or less carbon atoms; ketones having 6 or less carbon atoms; esters having 6 or less carbon atoms; and polyvalent alcohols having 6 or less carbon atoms.

Examples of the organic solvents include: monovalent alcohols (e.g. methanol, ethanol, n-propanol, isopropanol, n-butanol, isobutanol, 2-butanol, cyclohexanol, benzyl alcohol, fluorinated alcohol); ketones (e.g. acetone, methyl ethyl ketone, methyl isobutyl ketone); esters (e.g. methyl acetate, ethyl acetate, butyl acetate); polyvalent alcohols (e.g. ethylene glycol, diethylene glycol, propylene glycol, glycerin); amides (e.g. N,N-dimethylformamide, dimethylformamide); sulfoxides (e.g. dimethylsulfoxide); and ethers (e.g. methyl cellosolve, ethylene glycol diethyl ether). Particularly preferable are methanol, ethanol, n-propanol, isopropanol, n-butanol, isobutanol, 2-butanol, acetone, methyl ethyl ketone, methyl isobutyl ketone, methyl acetate, ethyl acetate, ethylene glycol, diethylene glycol, propylene glycol and glycerin.

The organic solvent is required neither to dissolve the web W nor to allow the web W to swell. To make the coating of an alkaline saponification solution easier, desirably an organic solvent having an appropriately low surface tension is selected, as described in the section relating to the physical properties of alkaline solutions. The percentage of the organic solvent used in solvent is determined depending on the kind of the solvent, the miscibility with (solubility in) water, and reaction temperature and time. To complete saponification reaction in a short period of time, preferably the solution is adjusted to have a high concentration. However, too high a concentration of solvent might allow the components (plasticizer, etc.) in the web W to be extracted and the web W to swell excessively, and thus, proper selection is required. The mixing ratio of water to organic solvent is preferably 3/97 to 85/15, more preferably 5/95 to 60/40, and much more preferably 15/85 to 40/60. With the mixing ratio within the above range, the whole surface of the web W can undergo saponification treatment easily and uniformly without causing the deterioration of optical characteristics.

As an alkali agent in the alkaline solution, any one of inorganic bases and organic bases can be used. To allow saponification reaction at a low alkaline concentration, a strong base is preferably used. Such strong bases are preferably hydroxides of alkali metals (e.g. NaOH, KOH, LiOH); amines (e.g. perfluorotributylamine, triethylamine, diazabicyclononene, diazabicycloundecene); tetraalkylammoniumhydroxide (as the alkyl group, methyl, ethyl, propyl or butyl group); and free bases of complex salts (e.g. [Pt(NH$_3$)$_6$](OH)$_4$), more preferably hydroxides of alkali metals, and most preferably NaOH and KOH.

The concentration of the alkaline solution is determined depending on the kind of the alkali used, and the reaction temperature and time. To complete saponification reaction in a short period of time, preferably the alkaline solution is adjusted so that it has a high alkali concentration. However, too high an alkali concentration may sometimes decrease the stability of the solution and cause precipitation when coating is performed for a long time. Preferably the concentration of the alkaline solution is 0.1 to 5 N, more preferably 0.5 to 5 N, and most preferably 0.5 to 3 N.

The alkaline solution used in this embodiment may also contain surfactant. Addition of surfactant allows, even if any of the substances contained in the web W is extracted by the organic solvent, the substance to be present stably in the alkaline solution, thereby preventing the extracted substance from precipitating or being solidified in the subsequent washing step.

The surfactant used is not limited as long as it is soluble or dispersible in the alkaline saponification solution of the present invention. Any one of nonionic surfactant and ionic surfactant (anionic, cationic or ampholytic) can be suitably used; however, from the viewpoint of solubility and saponification performance, particularly, nonionic surfactant or anionic surfactant is preferably used (see Japanese Patent Application Laid-Open No. 2003-313326).

To the above alkaline solution, antifoaming agent, any of organic solvents other than the above described ones, mildewproofing agents, antibacterial agents, and other additives (e.g. alkaline solution stabilizer (antioxidant etc.), water-soluble compounds (polyalkylene glycols, natural water-soluble resins, etc.)) may be added as solubility assistants for assisting the dissolution of surfactant or antifoamer in the alkaline solution.

Water used in the alkaline solution of this embodiment is preferably selected based on Japan Water Supply Law (Law No. 177, 1957) and the ministerial ordinance of water quality based thereon (Ordinance No. 56 of the Ministry of Health, 1978, Aug. 31), Japan Hot Spring Law (Law No. 125, 1948, Jul. 10 and the attached list thereof), and effects of elements or minerals in water prescribed by WHO Water Quality Standards.

Although the physical properties of the alkaline solution used in this embodiment are made up of the above described compositions, preferably the surface tension is 45 mN/m or lower and the viscosity is 0.8 to 20 mPa·s. The density of the alkaline solution is preferably 0.65 to 1.05 g/cm$^3$. Such physical properties make it possible to perform the coating of the alkaline solution stably and easily depending on the conveying speed, and besides, they fully realize the wettability by the solution on the surface of the web W, maintenance of the solution coated on the surface of the web W, and removability of the alkaline solution from the surface of the web W after saponification treatment.

In the following, cases will be described in which web W, which is produced by applying the alkaline saponification treatment method of the present invention, is applied to an optical compensation sheet and a liquid crystal display, respectively.

[Optical Compensation Sheet]

Web W having undergone alkaline saponification treatment is used as a transparent support of an optical compensation sheet. The optical compensation sheet has a layer structure in which web W having undergone alkaline saponification treatment, a resin layer for forming an orientation film, and an optically anisotropic layer in which the orientation of liquid crystal molecules is fixed are laminated in this order.

In the formation of an orientation film, not only the steps of: heating web W; applying an alkaline solution to one side surface of web W opposite to the side on which an orientation film is to be formed; keeping the temperature of the surface to which the alkaline solution has been applied; terminating the reaction; and washing the alkaline solution away from the surface of the film, but a step of coating the applied orientation film can be performed. And an optical compensation sheet as a final product can be completed by rubbing the surface of the orientation film, after its application and drying, and applying a liquid crystal molecular layer to the rubbed surface and drying the same. Not only the saponification treatment of web W, but also the formation of an orientation film as well as a liquid crystal molecule layer is performed continuously, whereby high productivity is obtained. Other advantages of applying the alkaline saponification treatment method of the present invention include: there is no elapse of time from the saponification treatment to the application of an orientation film; the activated saponified surface is less likely to deteriorate; the water-washing step of the saponification treatment also serves as a wet dust-removing step; and there occurs no loss of the roll end portion, which can be caused by a plurality of time of delivering and winding up operations.

An optical compensation sheet consists of: a transparent support made up of web W having undergone saponification treatment; an orientation film provided on the transparent support; and an optically anisotropic layer which is formed on the orientation film and has a discotic structural unit. Preferably the orientation film is a film which is made up of crosslinked polymer and has undergone rubbing. As a compound having a discotic structural unit and used for the optically anisotropic layer, a low-molecular-weight discotic liquid crystalline compound (monomer) or a polymer obtained by polymerizing a polymerizable discotic liquid crystalline compound can be used. Generally, discotic compounds are divided into two major categories: compounds having a discotic liquid crystal phase (i.e. discotic nematic phase); and compounds having no discotic liquid crystal phase. Generally discotic compounds have negative birefringence. An optically anisotropic layer utilizes the negative birefringence of a discotic compound.

[Orientation Film]

Preferably the orientation film for an optically anisotropic layer is formed by rubbing a film made up of crosslinked polymer. More preferably the orientation film is made up of 2 types of crosslinked polymers. One of the two types of polymers is a polymer that is polymerizable by itself or with the aid of crosslinking agent. The orientation film can be formed by inducing reaction among polymers having a functional group or polymers into which a functional group has been introduced by light, heat or pH change, or by crosslinking polymers by introducing, using a crosslinking agent which is a highly reactive compound, a bonding group originated from the crosslinking agent among the polymers.

The polymers can be crosslinked by coating on a transparent support a coating solution containing polymers or a mixture of polymers and a crosslinking agent. Crosslinking treatment can be performed at any stage after coating an orientation film on a transparent support and before obtaining an optical compensation sheet. Taking into consideration the orientation of the compound having a discotic structure (optically anisotropic layer) which is formed on the orientation film, it is also preferable to perform final crosslinking treatment after the compound having a discotic structure has undergone orientation. Specifically, when coating on a transparent support a coating solution containing polymers and crosslinking agent capable of crosslinking the polymers, first the coating solution is heat dried and subjected to rubbing so that an orientation film is formed, and then a coating solution containing a discotic structural unit is applied to the orientation film, heated to a temperature equal to or higher than a temperature capable of forming a discotic nematic phase, and cooled so that an optically anisotropic layer is formed.

As polymers used in such an orientation film, polymers crosslinkable by themselves or polymers crosslinkable with the aid of crosslinking agent can be used, or more than one combination thereof can also be used. Examples of such polymers include: polymethyl methacrylate, acrylic acid/methacrylic acid copolymer, styrene/maleic imide copolymer, polyvinyl alcohol, denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, polyethylene, polypropylene, and polycarbonate. Silane coupling agents can also be used as such polymers. Water-soluble polymers (e.g. poly(N-methylolacrylamide), carboxymethylcellulose, gelatin, polyvinyl alcohol and denatured polyvinyl alcohol) are preferable. Of these water-soluble polymers, more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol which are different in polymerization degree in combination is particularly preferable.

The degree of saponification of polyvinyl alcohol is preferably 70 to 100%, more preferably 80 to 100%, and most preferably 85 to 95%. The degree of polymerization of polyvinyl alcohol is preferably 100 to 3000. The denaturing group of denatured polyvinyl alcohol can be introduced by copolymerization denaturation, chain-transfer denaturation or block-copolymerization denaturation. Examples of denaturating groups include: hydrophilic groups (e.g. carboxylic acid group, sulfonic group, phosphonic group, amino group, ammonium group, amide group and thiol group); hydrocarbon groups having 10 to 100 carbon atoms, fluorine-substituted hydrocarbon groups; thioether groups; polymerizable groups (e.g. unsaturated polymerizable groups, epoxy group and aziridinyl group); and alkoxysilyl groups (e.g. trialkoxy, dialkoxy and monoalkoxy).

Examples of crosslinking agents for polymers (preferably water-soluble polymers, more preferably polyvinyl alcohol or denatured polyvinyl alcohol) include: aldehydes; N-methylol compounds; dioxane derivatives; compounds having an action when their carboxyl group is activated; active vinyl compounds; active halides; isooxazol; and dialdehyde starch. Two or more kinds of crosslinking agents can also be used in combination.

The amount of the crosslinking agent added is preferably 0.1 to 20% by mass of the amount of polymers and more preferably 0.5 to 15% by mass. The amount of the un-reacted crosslinking agent remaining in the orientation film is preferably 1.0% by mass or smaller and more preferably 0.5% by mass or smaller. If crosslinking agent remains in the orientation film in an amount larger than 1.0% by mass, sufficient durability can not be obtained. And if such an insufficiently durable orientation film is used in liquid crystal displays, reticulation might occur after it is used for a long period of time or after it is left stand in a high-temperature and high-humidity atmosphere for a long period of time.

Basically, an orientation film can be formed by coating the above described polymers, as material for forming an orientation film, on a transparent support containing crosslinking agent, heat drying (crosslinking) the applied polymers, and rubbing the formed polymer film. The crosslinking reaction may be performed at any stage after the polymers are coated on the transparent support, as described above. When water-soluble polymers such as polyvinyl alcohol are used as materials for an orientation film, it is preferable to use a mixed solvent of an organic solvent having an anti-foaming action (e.g. methanol) and water for the coating solution. The water:methanol ratio is preferably 0:100 to 99:1 and more preferably 0:100 to 91:9, in terms of mass ratio. Selecting such a coating solution makes it possible to prevent the generation of foam, thereby decreasing the defects of the orientation film and of the surface of the resultant optically anisotropic layer. In the formation of such an orientation film, a coating method such as spin coating, dip coating, curtain coating, extrusion coating, rod coating or roll coating is preferably used. Rod coating is particularly preferably used. The film thickness after drying is preferably 0.1 to 10 µm. The heat drying can be performed at 15° C. to 110° C. To cause sufficient crosslinking, the heat drying temperature is preferably 60° C. to 100° C. and particularly preferably 80° C. to 100° C. Although the drying can be performed for 1 minute to 36 hours, the drying time is preferably 1 minute to 30 minutes. Preferably the pH of the coating solution is set to a value suitable for the crosslinking agent used. When glutaraldehyde is used as the crosslinking agent, the pH of the coating solution is preferably 4.5 to 5.5 and particularly preferably 5.

The orientation film is formed on the transparent support or on the undercoat layer as described above. The orientation film can be obtained by crosslinking the polymer layer as described above and then rubbing the surface of the layer. The orientation film is provided to regulate the orientation direction of the discotic liquid crystal compound which is to be provided on the orientation film.

As the above described rubbing treatment, any one of the treatment methods widely used in the liquid crystal aligning step of the LCD production can be applied. Specifically, a method can be used in which the surface of an orientation film is rubbed in the prescribed direction using paper, gauze, felt, rubber, or nylon or polyester fiber to obtain orientation. Generally, treatment is performed by repeating rubbing operation several times using a cloth having a balanced filling of fibers of uniform length and diameter in it.

[Optically Anisotropic Layer]

The optically anisotropic layer of an optical compensation sheet is formed on the orientation film. Preferably the optically anisotropic layer a layer which is made up of a compound having a discotic structural unit and has negative birefringence. The optically anisotropic layer is a layer of a low-molecular-weight discotic liquid crystal compound (monomer) or a polymer layer obtained by polymerizing (curing) a polymerizable discotic liquid crystal compound. Generally discotic compounds have a structure in which straight-chain alkyl or alkoxy groups or substituted benzoyloxy groups are substituted radially as the straight chains of the discotic structural units as parents of the molecules. Discotic compounds include discotic liquid crystal compounds that have liquid crystal characteristics. Optically anisotropic layers formed from a discotic compound also include layers which are formed by allowing a low-molecular-weight discotic liquid crystal compound having a group reactive under heat or light to be a high-molecular-weight compound by polymerization or crosslinking and lose liquid crystal characteristics.

Preferably, the optically anisotropic layer is a layer which is made up of a compound having a discotic structural unit and has negative birefringence, wherein the plane of the discotic structural unit is tilted to the plane of the transparent support and the angle between the plane of the discotic structural unit and the plane of the transparent support varies across the depth of the optically anisotropic layer.

The angle of the plane of the discotic structural unit (tilt angle) is generally increased or decreased, across the depth of the optically anisotropic layer, with increase in distance of the optically anisotropic layer from the bottom surface of the orientation film. Preferably the tilt angle increases with increase in distance of the optically anisotropic layer from the bottom surface of the orientation film. Examples of types of tilt angle variation include: continuous increase; continuous decrease; intermittent increase; intermittent decrease; variation including both continuous increase and continuous decrease; and intermittent variation including increase and decrease. The intermittent variation includes the area where the tilt angle does not vary midway across the depth. Preferably the tilt angle increases or decreases as a whole, even if there is an area where it does not vary. More preferably the tilt angle increases as a whole and particularly preferably it increases continuously.

Generally, the optically anisotropic layer is obtained by: coating, on the orientation film, a solution of a discotic compound and any other compound in a solvent; drying the coating; heating the resultant film to a discotic-nematic-phase forming temperature; and cooling the heated film while keeping the orientation state (discotic nematic phase). Alternatively, the optically anisotropic layer is obtained by: coating, on the orientation film, a solution of a discotic compound and any other compounds (including e.g. polymerizable monomer, photoinitiator) in a solvent; drying the coating; heating the resultant film to a discotic-nematic-phase forming temperature and polymerizing the same (by irradiation of UV light etc.); and cooling the heated film. The discotic nematic liquid crystal phase—solid phase transition temperature is preferably 70 to 300° C. and particularly preferably 70 to 170° C.

Generally, the tilt angle of the discotic unit on the support side can be controlled by selecting the discotic compound used or the material used for the orientation film or by selecting the rubbing method used. Generally, the tilt angle of the discotic unit on the surface side (on the air side) can be controlled by selecting the discotic compound used or other compounds (e.g. plasticizer, surfactant, polymerizable monomer and polymer) used with the discotic compound. The degree of change in tilt angle can also be controlled by the selection described above.

As the plasticizer, surfactant or polymerizable monomer, any compounds can be used as long as they are properly compatible with the discotic compound used, and they can change the tilt angle of the discotic liquid crystal compound, or do not inhibit the orientation of the same. Of such compounds, polymerizable monomers (e.g. compounds having a vinyl group, vinyloxy group, acryloyl group or methacryloyl group) are preferable. Such compounds are used generally in an amount of 1 to 50% by mass and preferably 5 to 30% by mass of the discotic compound.

As the polymer, any polymer can be used as long as it is properly compatible with the discotic compound used and it can change the tilt angle of the discotic liquid crystal compound. Examples of such polymers include cellulose esters. Preferred examples of cellulose esters include: cellulose acetate, cellulose acetate propionate, hydroxypropyl cellulose, and cellulose acetate butylate. Such polymers are used generally in an amount of 0.1 to 10% by mass, preferably 0.1 to 8% by mass and particularly preferably 0.1 to 5% by mass of the discotic compound used so that they should not inhibit the orientation of the discotic liquid crystal compound.

[Sheet Polarizer]

A sheet polarizer has a layer structure in which an optical compensation sheet obtained by providing an orientation film and an optically anisotropic layer, in which the orientation of liquid crystal molecules is fixed, on web W; a polarizing film; and a transparent protecting film are laminated in this order. As the transparent protecting film, an ordinary cellulose acetate film may be used. Polarizing films include: iodine polarizing films, dye polarizing films in which a dichroic dye is used, and polyene polarizing films. Generally, iodine polarizing films and dye polarizing films are produced using a polyvinyl alcohol film. The relationship between the slow axis of web W and the transmission axis of the polarizing film varies depending on the type of the liquid crystal displays to which the sheet polarizer is applied. In TN-, MVA- and OCB-mode liquid crystal displays, web W and the polarizing film are arranged so that the slow axis and the transmission axis are substantially parallel to each other. In reflective liquid crystal displays, preferably they are arranged so that the slow axis and the transmission axis are substantially at an angle of 45°.

[Liquid Crystal Display]

An optical compensation film or a sheet polarizer is advantageously used in liquid crystal displays. TN-, MVA- and OCB-mode liquid crystal displays include liquid crystal cells and two sheets of polarizer arranged both sides of the cell.

The liquid cell supports liquid crystal between two electrode substrates. In liquid crystal displays, a single optical compensation sheet is used in such a manner that it is arranged between the liquid crystal cell and one of the two sheets of polarizer, or two optical compensation sheets are used in such a manner that they are arranged between the liquid crystal cell and one of the two sheets of polarizer and between the liquid crystal cell and the other sheet of polarizer. In OCB-mode liquid crystal displays, the optical compensation sheet may include a discotic compound or an optically anisotropic layer containing a rod shaped liquid crystal compound on web W. The optically anisotropic layer is formed by aligning the discotic compound (or rod shaped liquid crystal compound) and fixing the aligned state of the compound. Discotic compounds generally have a high birefringence. And discotic compounds have a variety of orientation forms. Thus, use of discotic compounds allows the production of optically compensation films having optical characteristics which conventional stretched birefringence films can not have.

In sheets of polarizer, web W can be used as a transparent protecting film, which is arranged between the liquid crystal cell and the polarizing film. Web W is used as a transparent protecting film for one sheet of polarizer (between the liquid crystal cell and the polarizing film) or as two transparent protecting films for two sheets of polarizer (between the liquid crystal cell and the polarizing film). The liquid crystal cell is preferably of OCB-mode or TN-mode. OCB-mode liquid crystal cell is a liquid crystal display device which employs liquid crystal cell of bend orientation in which rod shaped liquid crystal molecules are aligned substantially in opposite directions (symmetrically) between the upper and lower portions of the cell. Because the rod shaped liquid crystal molecules are aligned in opposite directions between the upper and lower portions of the cell, the liquid crystal cell of bend orientation mode has self-optically-compensatory function. Thus, this mode is also referred to as OCB mode (Optically Compensatory Bend) liquid crystal mode. Bend orientation-mode liquid crystal display devices offer the advantage of rapid response. In TN-mode liquid crystal cells, rod shaped liquid crystal molecules are aligned substantially horizontally when no voltage is applied and twisted with an angle of 60 to 120°. TN-mode liquid crystal cells are most often used as color TFT liquid crystal displays and are described in a number of literatures.

EXAMPLES

In the following the present invention will be described in further detail by examples; however, it is to be understood that these examples are not intended to limit the present invention. The effects of the flat bar 42 shape on the occurrence of web W failure due to its scratches and on the uniformity in alkaline solution scraping were examined using the alkaline saponification treatment line shown in FIG. 1 and compared.

[Operating Conditions]

In the alkaline saponification treatment line (first half part) shown in FIG. 1, one side of a continuous web W of a cellulose acetate film (thickness: 100 μm, width: 1895 mm) was coated with an alkaline solution (1 N, KOH solution) in an amount of 14 cc/m$^2$. Then, web W was subjected to alkaline saponification treatment at 110° C. for about 7 seconds, and the treated surface of the web W was coated with deionized water in an amount of 3 cc/m$^2$ so that the alkaline solution was diluted. Then the web W was washed and dried.

The speed of conveying web W was 20 m/min. The diameter R of flat bar 42 used was 8 mm. And flat bar 42 was rotated at the same speed as the speed of conveying web W and in the same direction as the direction in which web W is conveyed. The type and shape of the bars used are shown in Table 1.

TABLE 1

| | Type of bar | Groove depth μm | Surface roughness μm | Straightness μm |
|---|---|---|---|---|
| Ex. 1 | Flat bar A | none | 1.0 | 500 |
| Ex. 2 | Flat bar B | none | 1.8 | 500 |
| Ex. 3 | Flat bar C | none | 0.5 | 500 |
| Ex. 4 | Flat bar D | none | 1.0 | 800 |
| Ex. 5 | Flat bar E | none | 1.0 | 300 |
| Ex. 6 | Flat bar F | none | 1.0 | 100 |
| Com. Ex. 1 | Rolling bar A | 8 | — | — |
| Com. Ex. 2 | Rolling bar B | 5 | — | — |

[Bright Spot Defects]

Distilled water was continuously coated on web W using flat bar 42 or a rolling bar, and the time required for the continuous coating to cause the contaminant components accumulated on the surface of flat bar 42 to be stuck on web W was measured. The tendency of each bar to cause bright spot defects was evaluated based on the measurements. The evaluations are shown in Table 2.

[Scratch Defects]

Whether scratch defects occur or not was evaluated visually for flat bars 42 having different surface roughness values. The evaluations are shown in Table 2.

E . . . No scratches observed (0), G . . . Scratches hardly observed (1 to 2), F . . . A small number of scratches observed (3 to 5), B . . . A number of scratches observed (6 or more)

[Scraping Uniformity]

Uniformity in scraping an alkaline saponification reaction solution was evaluated visually for flat bars 42 having different straightness values. The evaluations are shown in Table 2.

E . . . No scraping non-uniformity observed, G . . . Scraping non-uniformity hardly observed, F . . . A small amount of scraping non-uniformity observed, B . . . A large amount of scraping non-uniformity observed

TABLE 2

| | Type of bar | Time required for bright spot defects to occur min | Occurrence of scratch defects | Uniformity in scraping alkaline solution |
|---|---|---|---|---|
| Ex. 1 | Flat bar A | 2500 | G | G |
| Ex. 2 | Flat bar B | | F | G |
| Ex. 3 | Flat bar C | | E | G |
| Ex. 4 | Flat bar D | | G | F |
| Ex. 5 | Flat bar E | | G | E |
| Ex. 6 | Flat bar F | | G | E |
| Com. Ex. 1 | Rolling bar A | 1500 | B | — |
| Com. Ex. 2 | Rolling bar B | 1700 | B | — |

First, the effects of groove depth on a bar surface were examined by comparing flat bar 42 of the present invention and conventional rolling bars A, B (see Example 1, Comparative Examples 1, 2). In conventional rolling bars, the time required for bright spot defects to occur was about 1500 minutes, while in flat bar 42 of the present invention, the time was about 2500 minutes. This confirmed that in flat bar 42 of the present invention, the length of time the bar could be used was significantly increased and contaminant components were less likely to accumulate on the bar. This clearly showed that flat bar 42 was less susceptible to accumulation of contaminant components because it had no grooves formed in it.

The effects of the surface roughness (Rmax) of flat bar 42 on the occurrence of scratch defects in web W were examined using flat bar 42 of the present invention (see Examples 1 to 3).

When the maximum surface roughness of flat bar 42 was higher than 1 μm, scratch defects in web W were confirmed visually, whereas when the maximum surface roughness of flat bar 42 was 1 μm or lower, the number of scratch defects in web W was significantly decreased. When the maximum surface roughness of flat bar 42 was 0.5 μm, no scratch defect was observed. On the other hand, when using roll bars A, B, a very large number of scratch defects were confirmed.

Lastly, the effects of the straightness of flat bar 42 on the uniformity in scraping an alkaline saponification reaction solution were examined using flat bar 42 of the present invention (Examples 3 to 6).

When the straightness of flat bar 42 was 800 μm, scraping non-uniformity was confirmed on part of web W. When the straightness of flat bar 42 was 500 μm, scraping non-uniformity was decreased. Further, when the straightness of flat bar 42 was 300 μm, almost no scraping non-uniformity was observed. At a straightness of 100 μm, no scraping non-uniformity was observed, indicating that scraping was uniformly performed.

As described so far, the method and apparatus for the alkaline saponification of a polymer film of the present invention makes it possible to uniformly and efficiently scrape the saponification reaction solution in the reaction terminating step of the alkaline saponification of a polymer film and prevent the occurrence of scratch defects in the polymer film, which might be a cause of product defects such as bright spot defects.

What is claimed is:

1. A method for alkaline saponification of a polymer film, comprising:
    an alkaline-solution coating step of coating a polymer film with an alkaline solution;
    a temperature keeping step of keeping the polymer film coated with the alkaline solution at temperature equal to or higher than room temperature;

a reaction terminating step of terminating the reaction by applying a diluting solvent or an acid solution to the polymer film kept at the temperature; and a washing step of washing away the alkaline solution from the polymer film on which the reaction has been terminated, wherein the reaction terminating step uses a bar coater having a bar with a flat surface and without a groove to apply the diluting solvent or acid solution to the polymer film and remove the alkaline solution from the polymer film, and wherein the flat bar has a maximum surface roughness Rmax of 1 μm or smaller and a straightness of 500 μm or lower.

* * * * *